T. J. SHEA.
METHOD OF WELDING PLATES.
APPLICATION FILED APR. 5, 1919.
1,311,422.
Patented July 29, 1919.
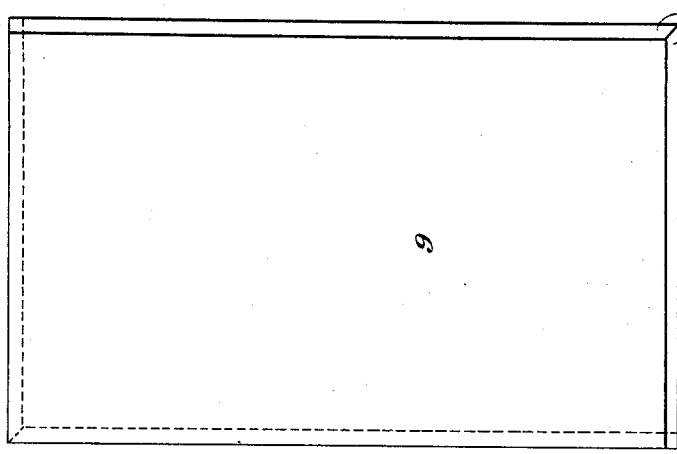
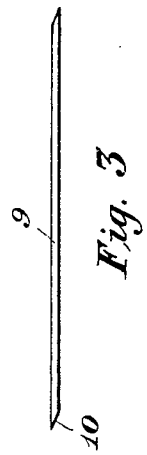
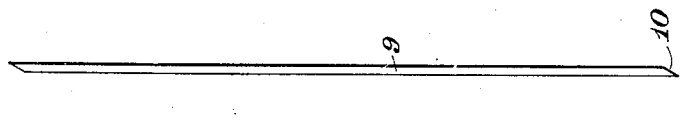
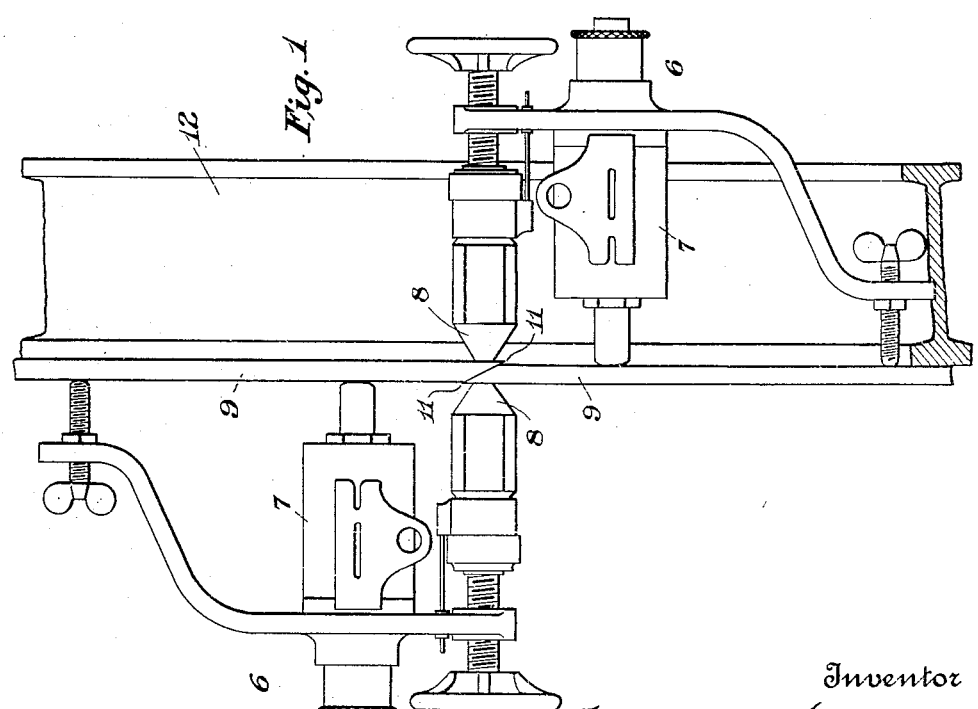
Inventor
Thomas J. Shea
By Geo. E. Tew
Attorney

UNITED STATES PATENT OFFICE.

THOMAS J. SHEA, OF PORTLAND, OREGON.

METHOD OF WELDING PLATES.

1,311,422.　　　　Specification of Letters Patent.　　Patented July 29, 1919.

Application filed April 5, 1919. Serial No. 287,789.

*To all whom it may concern:*

Be it known that I, THOMAS J. SHEA, citizen of the United States, residing at Portland, in the county of Multnomah and State of Oregon, have invented certain new and useful Improvements in Methods of Welding Plates, of which the following is a specification.

This invention relates to a method of welding plates, and it is particularly applicable to welding ship plates. The object of the invention is to provide a smooth and continuous outer surface on the work, which in ship building will materially decrease the skin friction, and enable heavier plates to be used, and which will produce smooth and tight joints around all the edges of the plates.

In ship building it is common to make lap joints between the plates. This produces considerable waste metal as well as making rough surfaces both inside and out, the latter causing considerable friction and the former having disadvantages with respect to the attachment of the plates to the frame. The present method avoids these objections. Although especially applicable to ships, the method can be used on tanks, houses, and other plate work. The joints are preferably produced by spot welding, the spots being placed an inch or two apart.

The invention is illustrated in the accompanying drawings, in which Figure 1 is an edge view showing the manner of joining the plates. Fig. 2 is a plan of a plate prepared for welding. Figs. 3 and 4 are edge views of the plate.

The welding may be done by means of magnetic spot welders such as disclosed in my pending application No. 255,480, filed September 24, 1918, and in the accompanying drawings these instruments are each indicated as a whole at 6, having a magnet 7, which holds the tools to the work, and a welding point 8 which by the magnetic attraction is pressed against the joint, in a manner more fully described in said application. Two of these tools are used, one on each side of the plates, and they are arranged opposite to each other so that the edges of the plates are clamped therebetween.

The plates are indicated at 9, and their edges are beveled or scarfed, as shown at 10. This bevel extends entirely around the plate, as shown in Figs. 2, 3, and 4, the bevels at opposite edges being on the opposite sides of the plate, so that they will match with each other around all the edges thereof, when the plates are joined. Preferably, the plates are arranged so that the bevels pass each other slightly, as shown in Fig. 1 at 11, whereby the joint will be somewhat thicker than the body of the plates. It will be noticed that the plates are wedged or lapped under each other along two of their edges and overlap each other along the other two ledges.

In welding plates in the manner described, they are set up with their edges lapped, and the spot welding tools are then applied to the joint. The welding points press against the metal at the joint, the magnet attracting one plate and the welding point being pressed against the adjoining plate, as described in my said application.

These provide the requisite pressure, and by application of the current the joints are spot welded, the instruments being moved to new positions as fast as the spots are completed.

The resulting structure is without rough edges or joints, both inside and outside, which has great advantages in ship work building. The waste incident to ordinary laps is prevented, saving from three to five hundred tons in an eight thousand ton ship. This metal can be taken up by using heavier plates without increasing the total weight of the ship. Instead of being welded at separate spots, the edges may be continuously welded by what are known as continuous spots placed very close together. And the welding action is also assisted, because the scarf joint reduces the thickness and mass of the metal to be heated. Before being welded, the plates are, of course, planed or scarfed off at the edges, which thereby removes all scale and gives a clean surface where the joints are formed. By the means described, ship and other plates can be much more easily joined than by the ordinary riveted lap joint, saving much labor and material, and producing a better joint.

In setting up the plates against the ship ribs or frames as indicated at 12 in Fig. 1, they may be either bolted or spot welded to the frame before they are welded together, and they are preferably so set that the first plate overlaps the next; that is, each succeeding plate is wedged in at its edges behind the bevels of the preceding plate or plates, so that plates fit up snug and neat to the frames and no liners or fillers are necessary between the plates and the frames, as heretofore, but the ship's plating is smooth both inside and out, and fits closely against the ribs or frames. Decks are better, also, made in this way, as they are smooth and without projecting joints.

I claim:

1. The method of joining plates, comprising scarfing the plates around all the edges thereof, the scarfs at opposite edges being on opposite sides thereof, and electrically welding the scarfed edges of adjoining plates, the opposite scarfed edges of each plate respectively underlapping and overlapping the meeting edges of the adjoining plates.

2. The method of joining plates having four edges, scarfing two opposite edges of each of the plates on opposite sides thereof, scarfing the remaining two edges of the plate on opposite sides thereof, and electrically welding said edges to the complementary edges of the adjoining plates.

3. The method of joining the edges of plates, comprising beveling the edges thereof and lapping the beveled edges, and electrically spot welding the lapped edges at a succession of spots along the joint.

4. The method of plating ships, comprising setting up plates flatly against the ship frames, said plates having beveled edges, with the bevels of the edges of adjacent plates engaging over and under each other respectively, and welding said edges together.

In testimony whereof I do affix my signature in presence of two witnesses.

THOMAS J. SHEA.

Witnesses:
W. T. KREBS,
PHILIP PHELAN.